(12) United States Patent
Meter (10) Patent No.: US 10,159,225 B2
(45) Date of Patent: Dec. 25, 2018

(54) TRAY FOR INCUBATING EGGS

(71) Applicant: HatchTech Group B.V., Veenendaal (NL)

(72) Inventor: Tjitze Meter, Veenendaal (NL)

(73) Assignee: HatchTech Group B.V., Veenendaal (NL)

( * ) Notice: Subject to any disclaimer, the term of this patent is extended or adjusted under 35 U.S.C. 154(b) by 350 days.

(21) Appl. No.: 14/766,860

(22) PCT Filed: Feb. 13, 2014

(86) PCT No.: PCT/NL2014/050089
§ 371 (c)(1),
(2) Date: Aug. 10, 2015

(87) PCT Pub. No.: WO2014/126466
PCT Pub. Date: Aug. 21, 2014

(65) Prior Publication Data
US 2016/0000047 A1   Jan. 7, 2016

(30) Foreign Application Priority Data

Feb. 14, 2013  (NL) .................................. 2010301

(51) Int. Cl.
*A01K 41/00*   (2006.01)
*A01K 41/06*   (2006.01)

(52) U.S. Cl.
CPC .................................. *A01K 41/065* (2013.01)

(58) Field of Classification Search
CPC ...... A01K 41/065; A01K 41/00; A01K 41/06; A01K 45/005; A01K 31/002; A01K 41/02; A01K 41/023; A01K 41/026

USPC .......................................... 119/322–327, 347
See application file for complete search history.

(56) References Cited

U.S. PATENT DOCUMENTS

| 3,860 A | 12/1844 | Wieting |
| 335,961 A | 2/1886 | Renwick |
| 456,794 A | 7/1891 | Burr |
| 832,395 A | 10/1906 | Lee |
| 1,115,236 A | 10/1914 | Nichols |
| 1,384,084 A | 7/1921 | Myers |

(Continued)

FOREIGN PATENT DOCUMENTS

| EP | 1104987 | 6/2001 |
| EP | 2174081 | 4/2010 |

(Continued)

OTHER PUBLICATIONS

International Search Report for related PCT Application No. PCT/NL2014/050089, dated Apr. 14, 2014 (4 pages).

(Continued)

*Primary Examiner* — Trinh T Nguyen
(74) *Attorney, Agent, or Firm* — N.V. Nederlandsch Octrooibureau; Tamara C. Stegmann; Lindsey A. Auerbach (57) ABSTRACT

The invention relates to a tray (1) for containing a number of eggs (2) in an incubation chamber, the tray comprising a number of egg accommodation spaces (3) in which space an egg is able to be hatched, and at least one passage (4) for a chicken through which passage a chicken hatched from said egg may pass through the tray and enter a chicken accommodation space located below the tray.

17 Claims, 6 Drawing Sheets

(56) References Cited

U.S. PATENT DOCUMENTS

| | | | | |
|---|---|---|---|---|
| 1,533,499 A | * | 4/1925 | Holbrook | A01K 41/06 119/323 |
| 1,626,394 A | | 6/1926 | Coatsworth | |
| 2,526,939 A | | 10/1950 | Edwards | |
| 3,003,463 A | * | 10/1961 | De Rijcke | A01K 41/065 119/325 |
| 3,147,737 A | | 9/1964 | Theili | |
| 3,147,738 A | * | 9/1964 | Theilig | A01K 41/06 119/322 |
| 3,470,851 A | * | 10/1969 | Cannon | A01K 41/065 119/322 |
| 3,489,124 A | * | 1/1970 | Cannon | A01K 41/065 119/322 |
| 3,958,711 A | * | 5/1976 | Morris | B65D 71/70 119/325 |
| 4,004,552 A | * | 1/1977 | Levin | A01K 41/065 119/322 |
| 4,398,499 A | * | 8/1983 | Blakely | A01K 41/065 119/325 |
| 4,558,661 A | * | 12/1985 | Theilig | A01K 41/065 119/322 |
| 5,046,454 A | * | 9/1991 | Jensen | A01K 41/065 119/174 |
| 5,179,913 A | * | 1/1993 | Cannon | A01K 41/02 119/300 |
| 2010/0186428 A1 | * | 7/2010 | Meter | A01K 1/0076 62/62 |

FOREIGN PATENT DOCUMENTS

| | | |
|---|---|---|
| GB | 32860 | 5/1913 |
| JP | 99056 | 1/1933 |
| JP | 2002-335801 | 11/2002 |
| WO | 9415454 | 7/1994 |
| WO | 2007018430 | 2/2007 |

OTHER PUBLICATIONS

MicroClimer88 Series: Incubation Technology for Optimal and Uniform Chick Quality. Retrieved from the Internet May 2, 2013 URL: <http://www.hatchtech.nl/incubationtechnology/microclimer_2.php?lang=uk> (1 page).

\* cited by examiner

TRAY FOR INCUBATING EGGS

CROSS REFERENCE TO RELATED APPLICATIONS

The present application is a national stage entry of PCT Application No. PCT/NL2014/050089, filed on Feb. 13, 2014, which claims priority to Netherlands Patent Application No. 2010301, filed on Feb. 14, 2013, the content of which are hereby incorporated by reference herein in their entirety.

BACKGROUND

The invention relates to an assembly of a crate providing a chicken accommodation space for hatching and rearing chickens and a tray for containing a number of eggs in an incubation chamber, the tray comprising a number of egg accommodation spaces in which space an egg is able to be hatched.

The present invention further relates to a method for hatching a number of eggs

Such a tray is known from and holds in general as much eggs as possible to utilize the capacity of a brooding machine or setter. It is known to arrange an egg in a hole in the bottom face of the tray. However these holes are not suitable for allowing passage for a chicken. Also, the egg will be held in the hole such that the tray can be manipulated e.g. tilted in the airflow. This means that in use of the tray, the hole will be closed off and remain closed off by the eggshell.

It is known to place trays in a stable for rearing chickens. However, such a stable does not provide ideal conditions for newly hatched chickens. In addition, the chickens need to climb over eggshells and/or other chickens to leave the tray. Also, potentially all chickens in the stable may contact the eggshells that are a potential source of germs and/or hurt themselves at the eggshells.

Hatcher baskets, like crates, for hatching/coming out of chickens are known. An important disadvantage of such a crate is that the eggshells pollute the accommodation wherein the hatched chickens live. These eggshells are a potential source of germs. In addition, the eggs and eggshells limit the walking space of the hatched chickens.

Hatching machines are known as well e.g. from EP1104987 (B1). However these machines do have the same disadvantage that the eggshells pollute the accommodation wherein the hatched chickens stay.

Method and Machines for initial rearing of chickens are known from EP2174081 A1 which shows a machine also referred to as "Hatchbrood". This machine provides a clean environment and optimal growing conditions to newly hatched chickens. A disadvantage is that handling of the newly hatched chicken is required to place the chicken in the Hatchbrood.

SUMMARY OF THE INVENTION

The invention aims to provide an assembly of a tray for containing a number of eggs in an incubation chamber, and a crate, wherein the tray enables not only to set eggs but also to hatch eggs and separate the newly hatched chickens as soon as possible from eggshells without need for handling the chickens and/or the chickens leaving the incubation chamber.

Another object of the invention is to provide an improved assembly of a tray for containing a number of eggs in an incubation chamber, and a crate, wherein the assembly solves at least partly a problem associated with known trays.

Yet another object of the invention is to provide an alternative assembly of a tray for containing a number of eggs in an incubation chamber, and a crate.

According to a first aspect of the invention this is realized with an assembly according to claim 1. Because of the presence of the passage or passages, the tray enables separation of the hatching process from the initial rearing of the hatched chicken in the same incubation chamber without intervention by a chicken handling device or operator. The passages may be a series of separate holes. The passage may be a slit where through several chickens may pass simultaneously. An egg accommodation space in which space an egg is able to be hatched means that an egg is firmly held in said space such that the tray may be manipulated in an forced air flow in the incubation chamber. This handling, e.g. tilting of the tray, is common in industry during the logistic process of the tray filled with eggs to ensure for example an even distribution of the air flow around the eggs over time. The egg accommodation space may be a hole with means to thinly hold the egg. The egg accommodation space may be an indentation in the bottom surface of the tray. The egg accommodation space may be a slit wherein a number of eggs may be accommodated in a row. The incubation chamber is a room which is suitable to be conditioned by a forced air flow such that e.g. temperature can be controlled with accuracy of 0.5 or even 0.1° C.

The crate is suitable to be placed in a condition space like a hatcher and takes advantage of the forced air flow in such a hatcher because of its open structure of the crate. In this case, the crate has a series of ventilation slits. Such a crate or hatcher basket has a bottom face and sidewalls for keeping chickens in the crate. The bottom face and sidewall provide the chicken accommodation space.

In an embodiment, the at least one passage is arranged between egg accommodation spaces. This way, different chickens may use the same passage and egg density, that is the number of eggs per tray, may be optimized.

In an embodiment, the tray comprises a number of passages which optimizes the transition of chickens from the tray to a chicken accommodation space located below the tray.

In an embodiment, each egg accommodation space adjoins a passage for a chicken. This even more optimizes the transition of chickens from the tray to a chicken accommodation space located below the tray.

In an embodiment, the passage is configured such that a chicken may pass the passage and an egg is not passable through the passage. This ensures separation of the eggs or eggshells from the chickens in their initial rearing because eggs and eggshells are left in the tray while chickens may pass through the passage to a chicken accommodation space located below the tray.

In an embodiment, the passage has an oval cross-section. This is considered an optimal shape with respect to a chicken because it allows passage of the widest part of a chicken without requiring a great surface area for the passage.

In an embodiment, an egg accommodation space comprises a passage for a chicken. This way, a left open egg accommodation space may, during use of the tray, function as a passage for a chicken.

In an embodiment, the egg accommodation space comprises support members for firmly holding an egg and wherein the support members are configured such that a chicken may safely pass said support member without damage. Known support members focus solely on engaging the egg in a firm way and are harmful for chickens.

In an embodiment, the egg accommodation space is a slit which is able to accommodate a number of eggs arranged in a row, and wherein the width of the slit is such that a chicken may pass the slit and an egg is not passable through the slit such that the slit constitutes the passage. This ensures an optimal egg density in the tray during use of the tray.

In an embodiment, the egg accommodation space has a similar, preferably identical, configuration to the passage. This facilitates use of the tray for an operator or an egg handling device.

In an embodiment, the tray comprises a raised edge at the outline of the tray for keeping hatched chickens on the tray.

In an embodiment of the assembly, at least one said passage is demarcated by the crate and the tray.

In an embodiment of the assembly, the crate and the tray are integrally formed.

In an embodiment of the assembly, the crate comprises a tray receiving space which is suitable to receive the tray in a sliding manner. This way, a tray may be easily slid from one side of the crate above the chicken accommodation space of the crate, even when crates are stacked.

In an embodiment of the assembly, the crate comprises a trough for containing feed for chickens. This enables feeding of the chickens shortly after hatching in the same conditioned chamber without intervention by a chicken handling device or operator.

In an embodiment of the assembly, the crate comprises at least one transparent portion for observing the chickens and allowing light to enter the chicken accommodation space.

In an embodiment of the assembly the crate has an open structure to allow air flow through the crate to be suitable to be placed in a condition space like a hatcher and take advantage of the forced air flow in such a hatcher.

In an embodiment of the assembly the crate has a series of ventilation slits.

According to a further aspect this is realized with a tray clearly intended for an assembly according to the invention.

According to a further aspect of the invention this is realized with a stack of a number of assemblies according to the invention. The crates including a tray, are suitable to be stacked and such a stack may be positioned in a conditioned chamber.

According to a further aspect of the invention this is realized with a method for hatching a number of eggs, the method comprising the steps of:
placing the eggs in a tray which tray comprises at least one passage for a chicken through which passage a chicken may pass through the tray and enter a chicken accommodation space located below the tray, and a raised edge at the outline of the tray for keeping hatched chickens in the tray,
arranging the tray on top of a crate, which crate provides a chicken accommodation space,
incubating the eggs for a required brooding period until hatching occurs,
passing of hatched chickens from the tray, through the passage and into the chicken accommodations space of the crate.

In an embodiment, the method comprises providing feed for the hatched chickens in the chicken accommodation space of the crate.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to an preferred embodiment shown in the drawing wherein shown in.

DETAILED DESCRIPTION OF EMBODIMENTS

Figure 1:
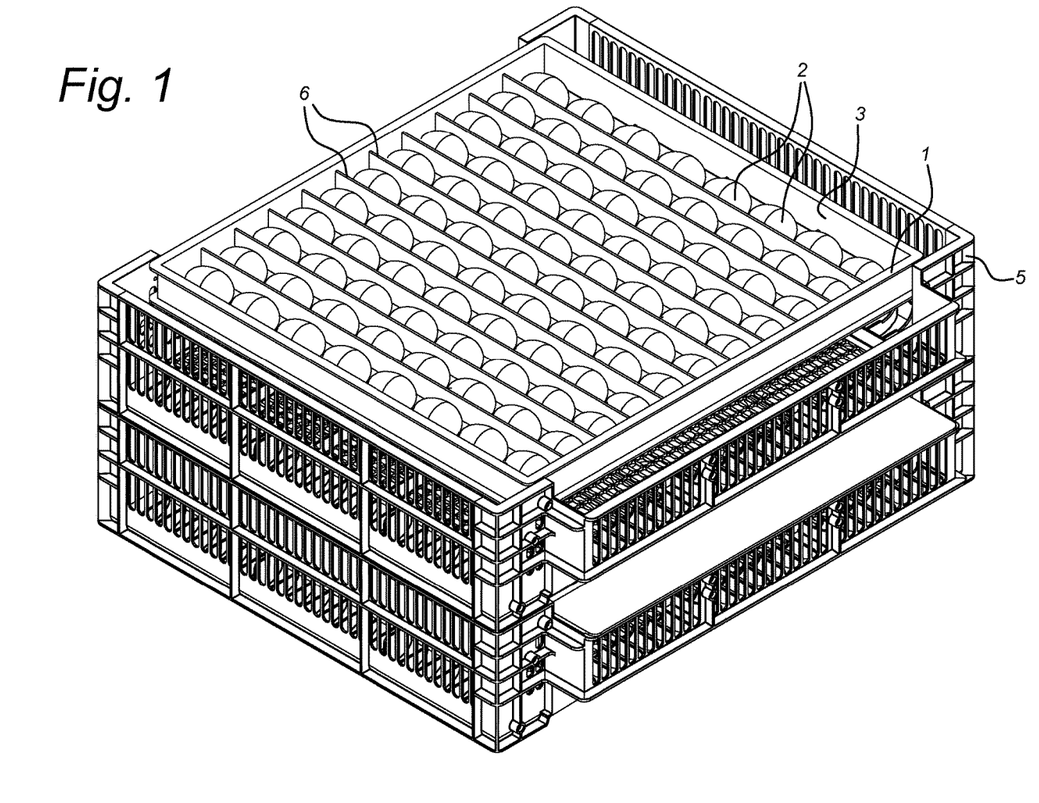
FIG. 1 in perspective view a stack of two assemblies of a crate and a tray according to the invention according to a first embodiment.
Figure 2:
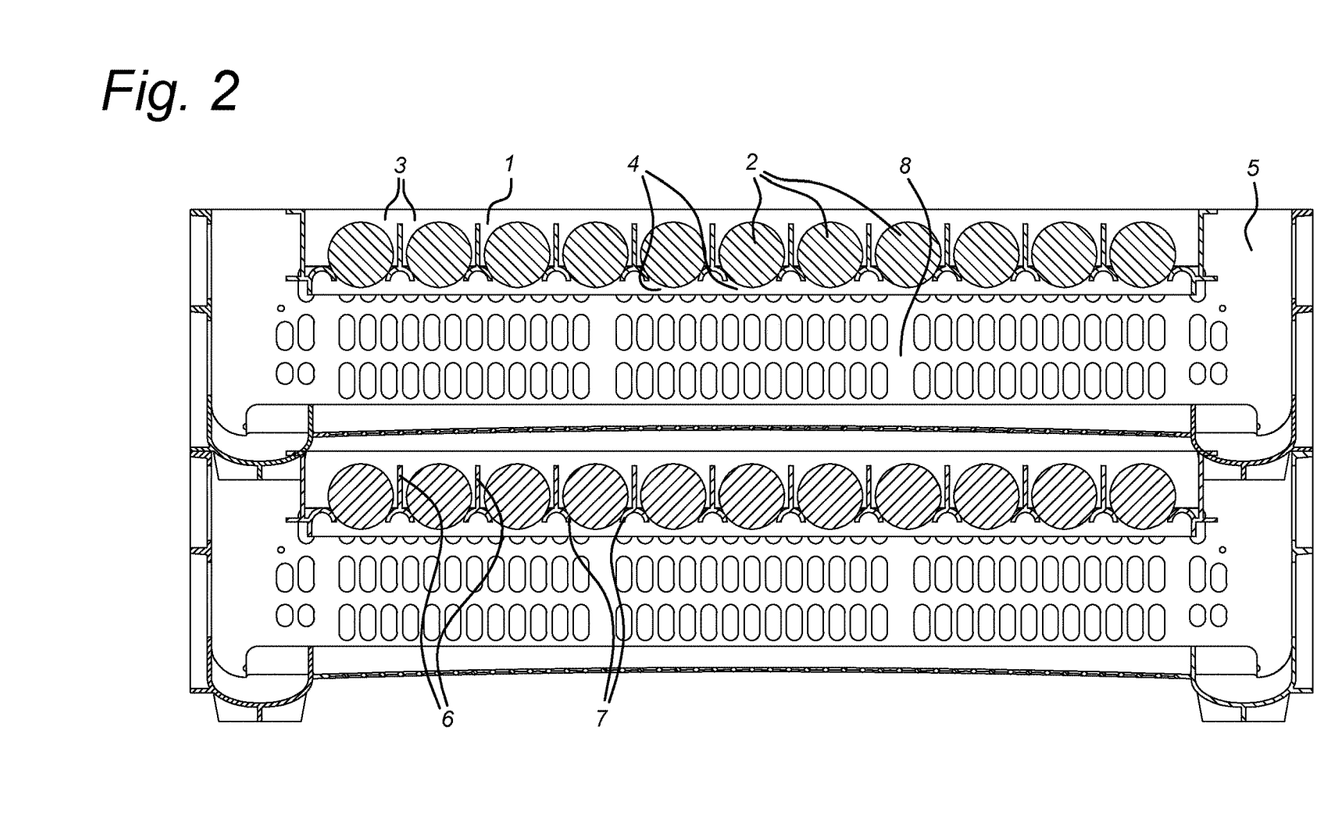
FIG. 2 the stack according to FIG. 1 in cross sectional side view.

In the FIGS. 1 and 2 a first embodiment of a tray 1 according to the invention is shown. The tray 1 is shown in assembly with a crate 5. Here, a stack of two assemblies is depicted. The crate 5 providing a chicken accommodation space 8 for hatching and rearing chickens. The, here separate, tray 1 is arranged on top of the crate 5. The crate 5 has an open top such that a chicken may enter the chicken accommodation space 8 through a passage 4. The tray 1 contains a number of eggs 2. The tray is for use in an incubation chamber which is not shown. The tray 1 comprises a number of egg accommodation spaces 3. In this space 3 the eggs 2 are firmly held such that the eggs 2 may be hatched in a controlled manner. Here, the eggs are firmly held between side walls 6 and opposite stop bars 7. The tray 1 has a number of passages 4 for a chicken through which passage 4 a chicken hatched from an egg 2 may pass through the tray and enter a chicken accommodation space 8 located below the tray 1. The passage 4 is defined by two elongate stop bars 7 which bars demarcate a slit shaped passage 4. A number of eggs 2 arranged in a row rest on the opposite stop bars 7. The passage 4 is configured such that a chicken may pass the passage 4 and an egg 2 is not passable through the passage 4. The width of the slit is such that a chicken may pass the slit and an egg is not passable through the slit such that the slit constitutes the passage 4. In this case, the egg accommodation space 3 comprises or in other words constitutes a passage 4 for a chicken.

Figure 3:
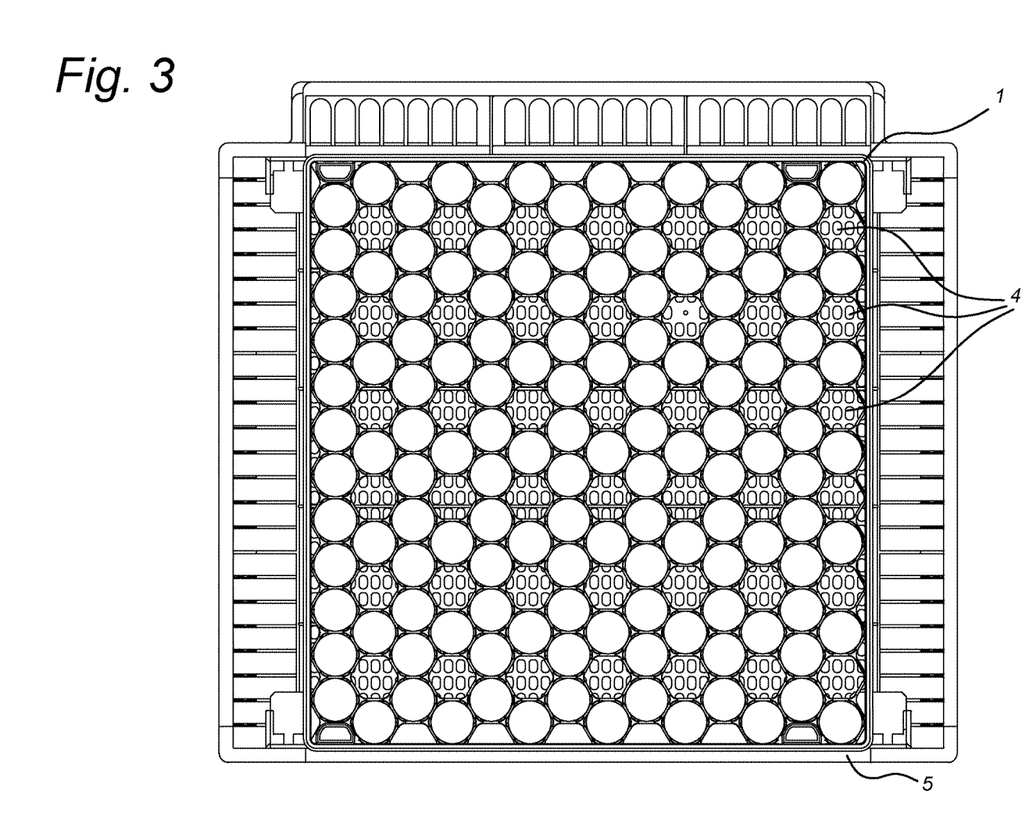
FIG. 3 in top view a stack of two assemblies of a crate and a tray according to the invention according to a second embodiment.
Figure 4:
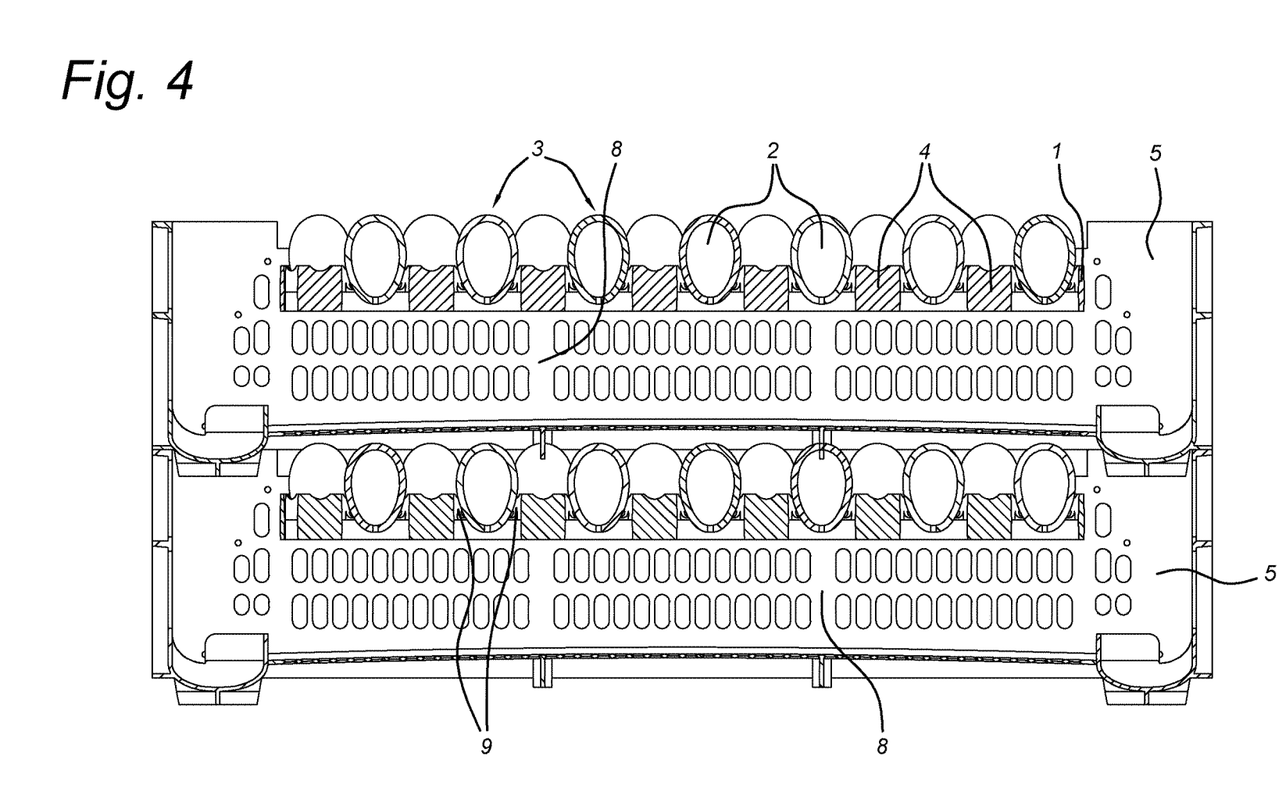
FIG. 4 the stack according to FIG. 2 in cross sectional side view.

In the FIGS. 3 and 4 a second embodiment of a tray 1 according to the invention is shown. The tray 1 comprises a number of, in this case separate, egg accommodation spaces 3. In this space 3 the eggs 2 are firmly held such that the eggs 2 may be hatched in a controlled manner. The tray 1 has a number of passages 4 for a chicken through which passage 4 a chicken hatched from an egg 2 may pass through the tray and enter a chicken accommodation space 8 located below the tray 1. The at least one passage 4 is arranged between egg accommodation spaces 3. Here, each egg accommodation space 3 adjoins a passage for a chicken 4. In this case, the egg accommodation space 3 has a similar, preferably identical, configuration to the passage 4.

Figure 5:
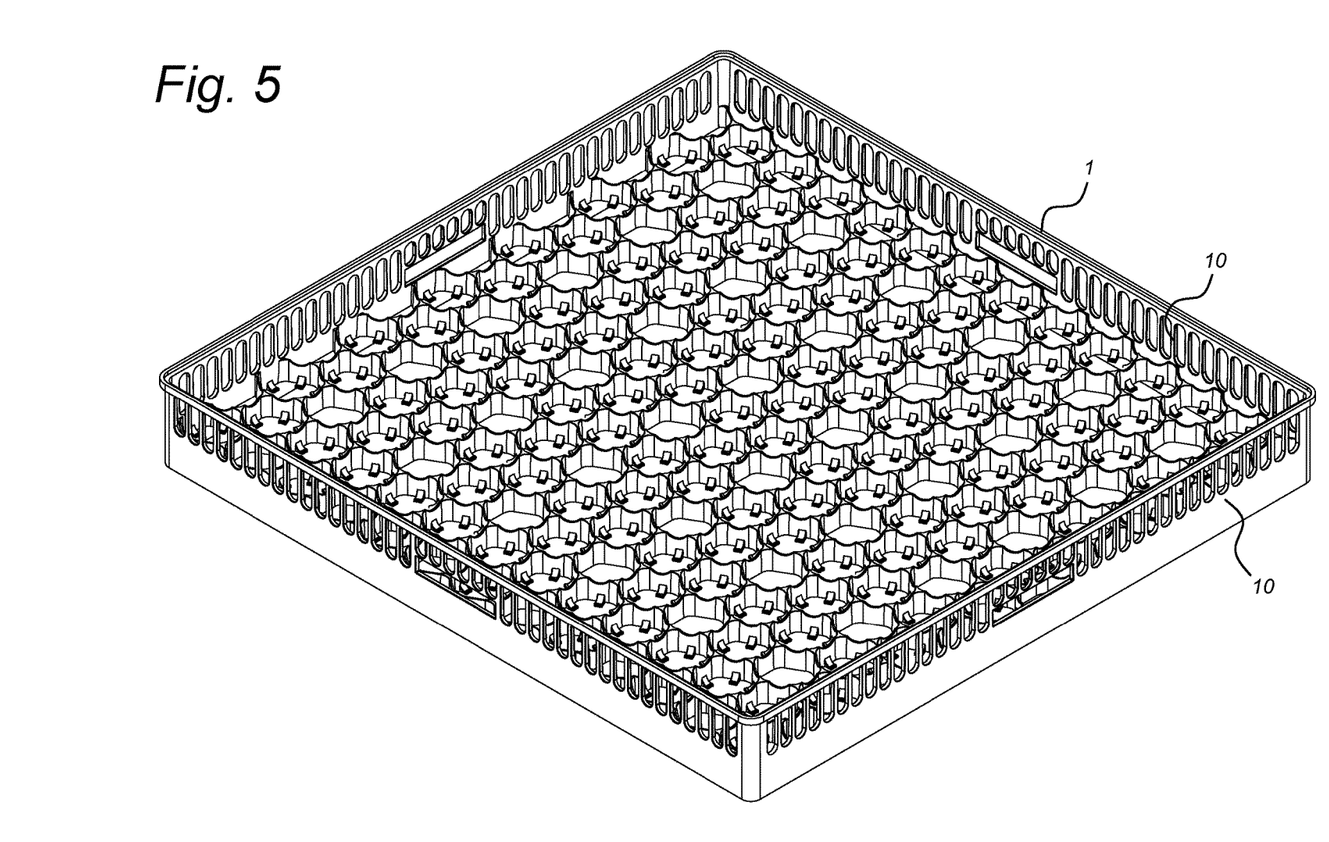
FIG. 5 a further embodiment of a tray in perspective view.
Figure 6:
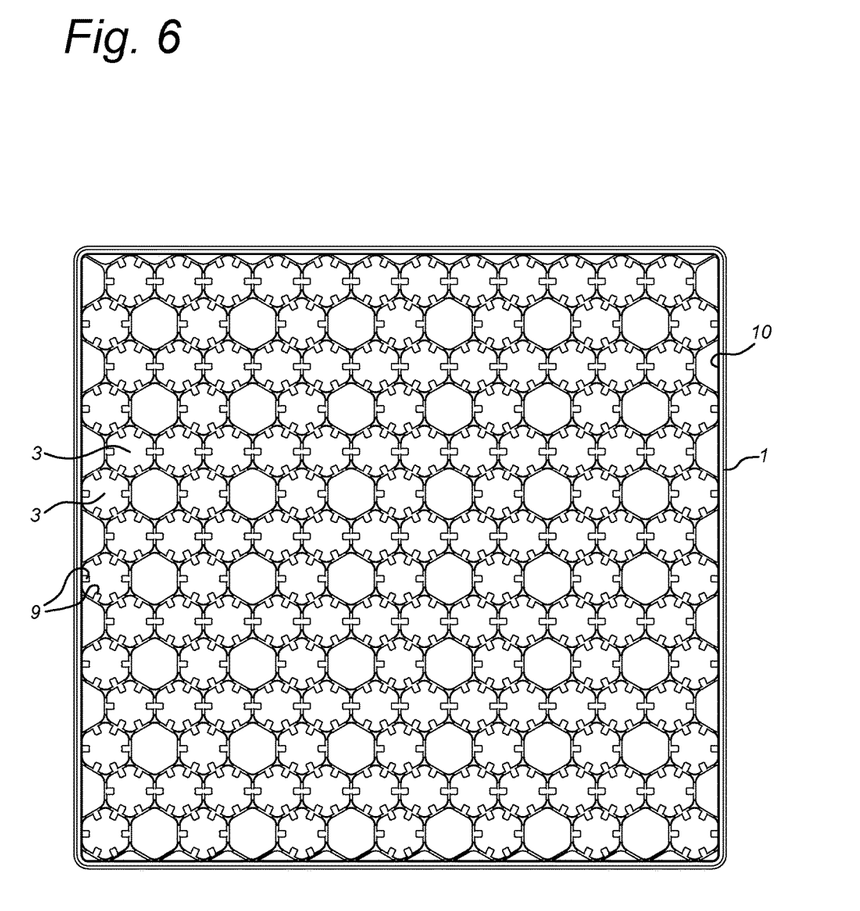
FIG. 6 the tray of FIG. 5 in top view.

FIGS. 5 and 6 show a further embodiment of a tray 1. The tray comprises a raised edge 10 at the outline of the tray 1 for keeping hatched chicken on the tray 1. The egg accommodation space 3 comprises a passage for a chicken such that if left open, that is not filled with an egg, egg accommodation space may function as a passage. The egg accommodation space 3 comprises support members 9 for firmly holding an egg and wherein the support members are configured such that a chicken may safely pass said support member without damage.

During use of the tray 1 in assembly with a crate 5, the following steps are taken for hatching a number of eggs 2:

placing the eggs 2 in a tray 1 which tray comprises at least one passage 4 for a chicken through which passage 4 a chicken may pass through the tray 1 and enter a chicken accommodation space 8 located below the tray 1,
 arranging the tray 1 on top of a crate 5, which crate provides a chicken accommodation space 8,
 brooding the eggs 2 for a required brooding period until hatching occurs,
 passing of hatched chickens from the tray 1, through the passage 4 and into the chicken accommodations space 8 of the crate 5.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. An assembly of a crate providing a chicken accommodation space for hatching and rearing chickens and a tray for containing a number of eggs in an incubation chamber, the tray comprising;
 a number of egg accommodation spaces in which space an egg is able to be hatched,
 a number of passages arranged between egg accommodation spaces and are configured such that a chicken hatched from said egg passes through a passage to the chicken accommodation space located below the tray and an egg is not passable through a passage
the crate having;
 an open top,
 wherein the tray is, arranged on top of the crate, and wherein the assembly is suitable to be stacked,
 wherein the egg accommodation space comprises support members for firmly holding an egg and wherein the support members are configured such that a chicken safely passes said support member without damage.

2. The assembly according to claim 1, wherein each egg accommodation space adjoins a passage for a chicken.

3. The assembly according to claim 1, wherein the passage has an oval cross-section.

4. The assembly according to claim 1, wherein the egg accommodation space is a slit which is able to accommodate a number of eggs arranged in a row, and wherein the width of the slit is such that a chicken passes the slit and an egg is not passable through the slit such that the slit constitutes the passage.

5. The assembly according to claim 1, wherein the egg accommodation space has a similar-configuration to the passage.

6. The assembly according to a claim 1, comprising a raised edge at the outline of the tray for keeping hatched chicken on the tray.

7. The assembly according to claim 1, wherein at least one said passage is demarcated by the crate and the tray.

8. The assembly according to claim 1, wherein the crate and the tray are integrally formed.

9. The assembly according to claim 1, wherein the crate comprises a tray receiving space which is suitable to receive the tray in a sliding manner.

10. The assembly according to claim 1, the crate comprising a trough for containing feed for chickens.

11. The assembly according to claim 1, wherein the crate comprises at least one transparent portion for observing the chickens and allowing light to enter the chicken accommodation space.

12. A stack of a number of assemblies according to claim 1.

13. The assembly according to claim 1, wherein the crate has an open structure to allow air flow through the crate to be suitable to be placed in a condition space like a hatcher and takes advantage of the forced air flow in such a hatcher.

14. The assembly according to claim 13, wherein the crate has a series of ventilation slits.

15. A tray, being stackable with a crate to form an assembly according to claim 1.

16. The assembly according to claim 5, wherein the egg accommodation space has an identical configuration to the passage.

17. The assembly according to claim 1, wherein the number passages are located laterally adjacent to the number of egg accommodation spaces in the tray.

* * * * *